(12) United States Patent  
Carter

(10) Patent No.: US 9,229,245 B2  
(45) Date of Patent: Jan. 5, 2016

(54) EARPIECE-LESS EYEGLASS APPARATUS AND STRAP ATTACHMENT MECHANISM

(71) Applicant: Troy L. Carter, Abilene, TX (US)

(72) Inventor: Troy L. Carter, Abilene, TX (US)

( * ) Notice: Subject to any disclaimer, the term of this patent is extended or adjusted under 35 U.S.C. 154(b) by 75 days.

(21) Appl. No.: 14/302,563

(22) Filed: Jun. 12, 2014

(65) Prior Publication Data

US 2015/0085244 A1    Mar. 26, 2015

Related U.S. Application Data

(60) Provisional application No. 61/960,707, filed on Sep. 25, 2013.

(51) Int. Cl.
*G02C 5/22* (2006.01)
*G02C 3/00* (2006.01)
*G02C 5/14* (2006.01)

(52) U.S. Cl.
CPC .............. *G02C 3/003* (2013.01); *G02C 5/2209* (2013.01); *G02C 5/2254* (2013.01); *G02C 5/146* (2013.01); *Y10T 24/1371* (2015.01)

(58) Field of Classification Search
CPC .... G02C 3/003; G02C 5/2209; G02C 5/2254; G02C 2200/04; G02C 2200/06; G02C 2200/22; Y10T 24/1371; F16C 11/106; F16C 11/12

USPC ........ 351/51, 111–126, 140–153; 403/76–77, 403/90, 114–115, 122, 348–349, 353, 403/DIG. 7; 24/3.3; 16/228
See application file for complete search history.

(56) References Cited

U.S. PATENT DOCUMENTS 7,427,133 B2    9/2008    Carter

*Primary Examiner* — Scott J Sugarman
*Assistant Examiner* — Kristina Deherrera
(74) *Attorney, Agent, or Firm* — Steven W. Smith

(57) ABSTRACT

An earpiece-less eyeglass apparatus and retainer-strap attachment mechanism. First and second attachment mechanisms are mounted on each side of a lenticular frame. Each attachment mechanism includes a stemball assembly, a socket housing, and a spring. The stemball assembly includes a shaft, a narrow neck, and a ball. The socket housing includes a primary socket, a secondary socket, and a narrow slot joining the primary and secondary sockets. The spring is mounted within the primary socket and the slot, and is shaped to form a rounded portion within the primary socket and a narrow restriction portion within the slot for receiving, respectively, the ball and the neck of the stemball assembly. The narrow restriction portion locks the ball into the secondary socket without placing stress on the housing when the neck of the stemball assembly is slid through the slot, moving the ball into the secondary socket.

15 Claims, 13 Drawing Sheets

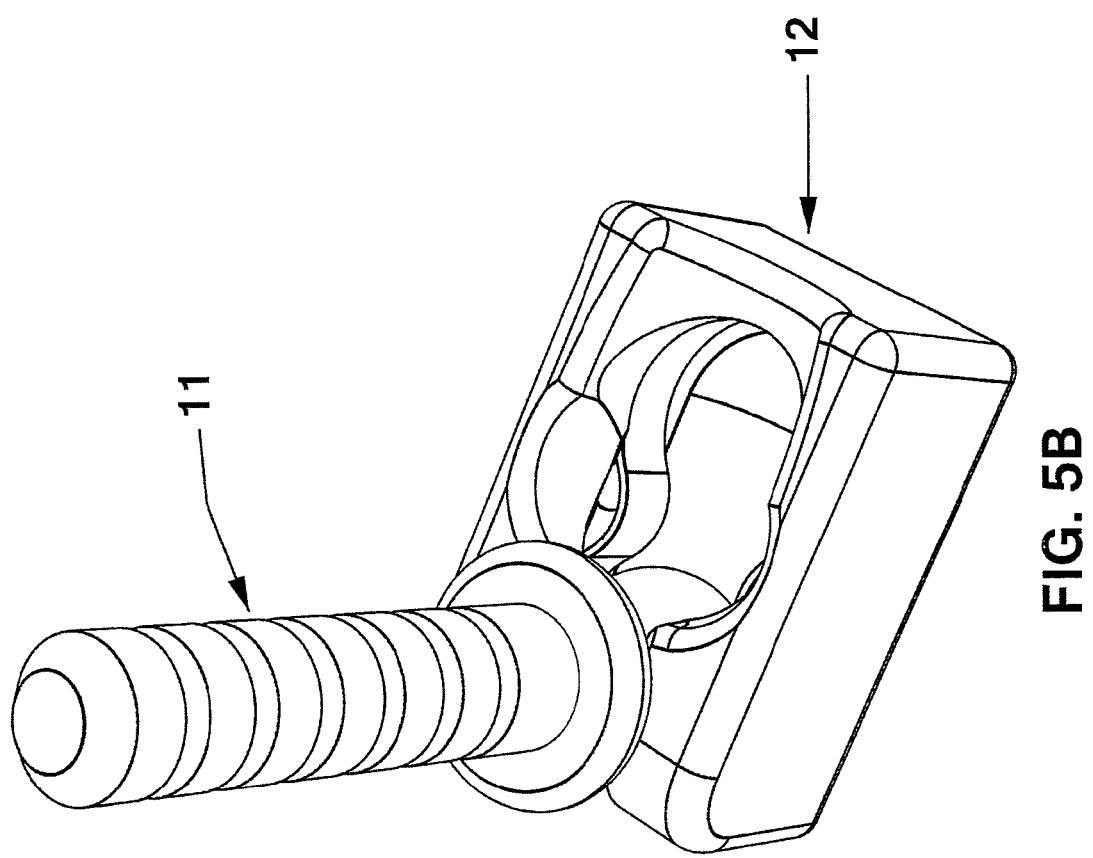

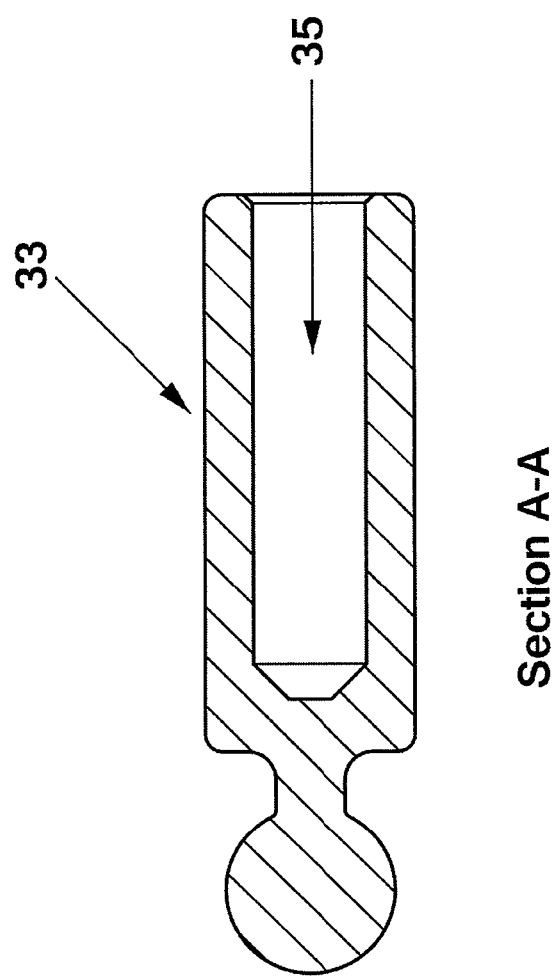

EARPIECE-LESS EYEGLASS APPARATUS AND STRAP ATTACHMENT MECHANISM

CROSS-REFERENCE TO RELATED APPLICATIONS

This application claims the priority benefit under 35 U.S.C. §119(e) of U.S. Provisional Application No. 61/960,707 filed on Sep. 25, 2013, the disclosure of which is incorporated herein by reference in its entirety.

TECHNICAL FIELD

The present invention relates to mechanical connectors. More particularly, and not by way of limitation, the present invention is directed to an attachment mechanism for connecting a strap to an object such as an earpiece-less eyeglass frame.

BACKGROUND

Straps are used to hold a variety of objects together. For example, a retainer strap may be attached to the earpieces of a pair of eyeglasses, including sunglasses, to hold them in place on a user's face. Short elastic straps may be utilized to hold the eyeglasses in place during physical activities such as various sporting events. Longer, generally non-elastic straps connected to the earpieces may be placed around a user's neck, so that the user can remove the eyeglasses from his face and let them hang by the retainer strap when not in use. However, the user still has to contend with uncomfortable earpieces and with strap-connecting mechanisms that add bulk or come loose from the earpieces.

A known solution to this problem has been utilized with sunglasses in an ophthalmologist's eye care center. The sunglasses were provided to patients who had had their eyes dilated during various procedures in the eye care center. An earpiece retainer pin was removed from the frame of the sunglasses, and the earpieces were removed. The pin was pierced through a retainer strap and was then replaced in the frame, thereby permanently attaching the retainer strap to the eyeglass rim.

Although this solved the problem of uncomfortable earpieces, it did not provide the user with the ability to interchange retainer straps or move a retainer strap from one pair of eyeglasses to another.

Co-owned U.S. Pat. No. 7,427,133 discloses an earpiece-less eyeglass frame that utilizes a ball-and-socket mechanism for quickly and easily attaching and detaching a strap to the temple end of the eyeglasses. The connector mechanism includes a "stemball" that is connected into the distal end of an eyeglass retainer strap. The stemball is sized for insertion into a socket in the end of the plastic eyeglass frame where a traditional earpiece would normally be attached. The stemball is initially inserted into a round opening of the socket in the eyeglass frame. The stemball is then slid by its shaft past a narrow restriction in the body of the socket into a secondary distal socket where it "snaps/clicks" into place.

SUMMARY

A problem with the attachment mechanism disclosed in U.S. Pat. No. 7,427,133 is that the plastic at the point of the narrow restriction in the socket wears down over time and will not hold the stemball in place. Alternatively, the repeated stress caused by sliding the stemball past the narrow restriction may cause the body of the socket to crack or break.

An additional problem with earpiece-less eyeglasses arises from the fact that the strap attaches to the lens frame where the earpiece would normally attach. Unlike goggles, which have a thick strap that attaches at the center of the side of the frame so that a good seal can be maintained around the eyes, earpieces generally attach at or near the top of the frame in order to minimize interference with the wearer's peripheral vision. As can be appreciated, when a retainer strap is attached to the earpiece-less eyeglasses and is tightened around the user's head, a rearward force is applied to the connector at the top of the frame. The force from the strap rotates the frame upward, causing the top of the frame to move rearward. If the top of the frame is rotated too far to the rear, the top of the frame may touch the user's eyebrows or eyelashes causing discomfort, smearing on the lenses, and/or fogging of the lenses. Additionally, this rotation changes the pantoscopic tilt of the lenses, i.e., the tilt of the lenses in front of the wearer's eyes. Any pantoscopic tilting of a prescription lens in relation to the eye can change the intended correction of the power of that lens, thus blurring vision. Also, any pantoscopic tilt can induce unwanted astigmatism correction to a lens, even a non-prescription clear lens or sunglass lens. This again can blur vision.

The present invention overcomes the above shortcomings of the prior art by providing an improved mechanical connector for attaching and removing a strap from any object. In an exemplary embodiment described herein, the connector is configured to connect a removable retainer strap to an earpiece-less eyeglass frame utilizing a resilient metal spring to absorb pressures within the socket housing. A user may remove the retainer strap and replace it with an interchangeable strap of a different style or color in a matter of seconds and without damaging the plastic housing of the socket. This may be done for fashion purposes or because the user is about to engage in a different activity. For example, the user may remove a long strap used in his office and replace it with a shorter elastic strap used for sports. Alternatively, the user may be moving from indoors to outdoors, and may remove a strap from a pair of eyeglasses such as reading glasses and attach the strap to a pair of sunglasses. Use of a strap instead of earpieces enables the user to remove the eyeglasses from the eyes and dangle them by the strap on the user's chest, rotate them to the back of the neck, or place them onto the crown of the head, all while eliminating the discomfort of earpieces.

In exemplary embodiments described herein, the upward rotational force on the frame created by the rearward force on the retainer strap is counter-balanced by creating a moment arm within the stemball/socket connector that acts to rotate the frame downward, restoring the proper pantoscopic tilt. In one embodiment, the housing of the socket is angled downward a few degrees, while in another embodiment the housing remains horizontal while the socket within the housing is angled downward.

Thus, one exemplary embodiment discloses an earpiece-less eyeglass apparatus that includes a lenticular frame for holding at least one eyeglass lens; and first and second attachment mechanisms on each side of the lenticular frame for removably attaching a retainer strap directly to the frame. Each of the first and second attachment mechanisms includes an elongate stemball assembly, a socket housing, and an elastic flat metal strip forming a spring. The stemball assembly includes a shaft portion, a ball, and a neck portion joining the shaft and the ball, wherein the shaft portion is configured to connect to an end of the retainer strap, and the ball has a diameter greater than the neck portion. The socket housing has formed therein, a primary hollow socket, a secondary hollow socket, and a narrow slot joining the primary and secondary sockets, wherein a front end of the socket housing is mounted to the lenticular frame. The elastic flat metal strip is mounted within the primary and secondary hollow sockets and underlying the slot, the strip being shaped to form a rounded portion within the primary socket, a narrow restriction portion underlying the slot, and a diverging portion within the secondary socket. The rounded portion of the elastic flat metal strip is sized to receive the ball of the stemball assembly, and the narrow restriction portion locks the ball into the secondary socket without placing stress on the housing when the ball of the stemball assembly is pressed through the narrow restriction portion into the diverging portion of the strip.

Another exemplary embodiment discloses an attachment mechanism for attaching a strap to an object. The attachment mechanism includes an elongate stemball assembly, a socket housing, and an elastic flat metal strip forming a spring. The stemball assembly includes a shaft portion, a ball, and a neck portion joining the shaft and the ball, wherein the shaft portion is configured to connect to an end of the strap, and the ball has a diameter greater than the neck portion. The socket housing has formed therein, a primary hollow socket, a secondary hollow socket, and a narrow slot joining the primary and secondary sockets, wherein a front end of the socket housing is configured to mount to the object. The elastic flat metal strip is mounted within the primary and secondary hollow sockets and underlying the slot, the strip being shaped to form a rounded portion within the primary socket, a narrow restriction portion underlying the slot, and a diverging portion within the secondary socket. The rounded portion of the elastic flat metal strip is sized to receive the ball of the stemball assembly, and the narrow restriction portion locks the ball into the secondary socket without placing stress on the housing when the ball of the stemball assembly is pressed through the narrow restriction portion into the diverging portion of the strip.

BRIEF DESCRIPTION OF THE SEVERAL VIEWS OF THE DRAWING

In the following, the essential features of the invention will be described in detail by showing preferred embodiments, with reference to the attached figures in which:

FIGS. 5A-5E illustrate an exemplary sequence of placing the stemball assembly into the socket, locking the ball into place, maneuvering the stemball assembly within the socket, and rotating the stemball assembly to a storage position;

FIG. 9 is a cross-sectional view of the second embodiment of the stemball assembly of FIG. 8 taken along line A-A.

DETAILED DESCRIPTION

Figure 1:
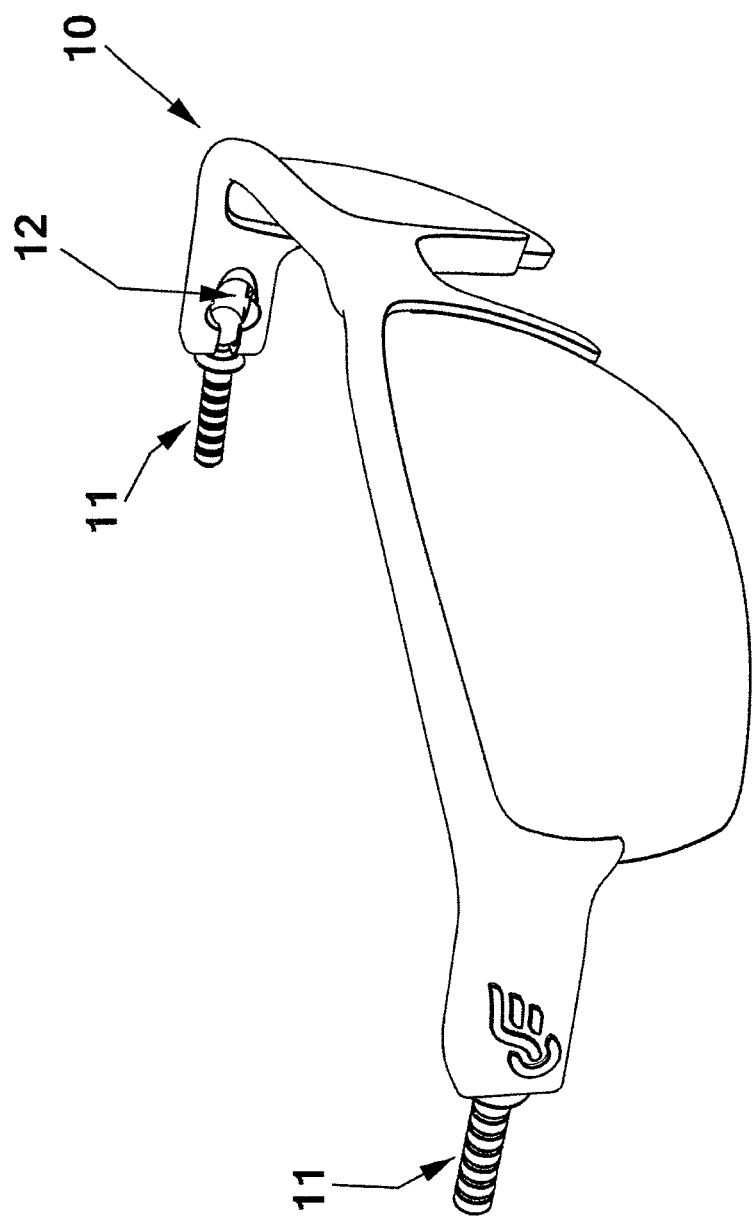
FIG. 1 is a front-quarter perspective view of an earpiece-less eyeglass frame with a stemball for a retainer strap attached at each end utilizing the mechanical connector of the present invention.

FIG. 1 is a front-quarter perspective view of a lenticular portion of an earpiece-less eyeglass frame 10 for holding the lenses. A stemball assembly 11 for connecting to a retainer strap is attached at each end of the frame utilizing the mechanical connector of the present invention. As shown, the stemball 11 is locked into a socket 12.

Figure 2:
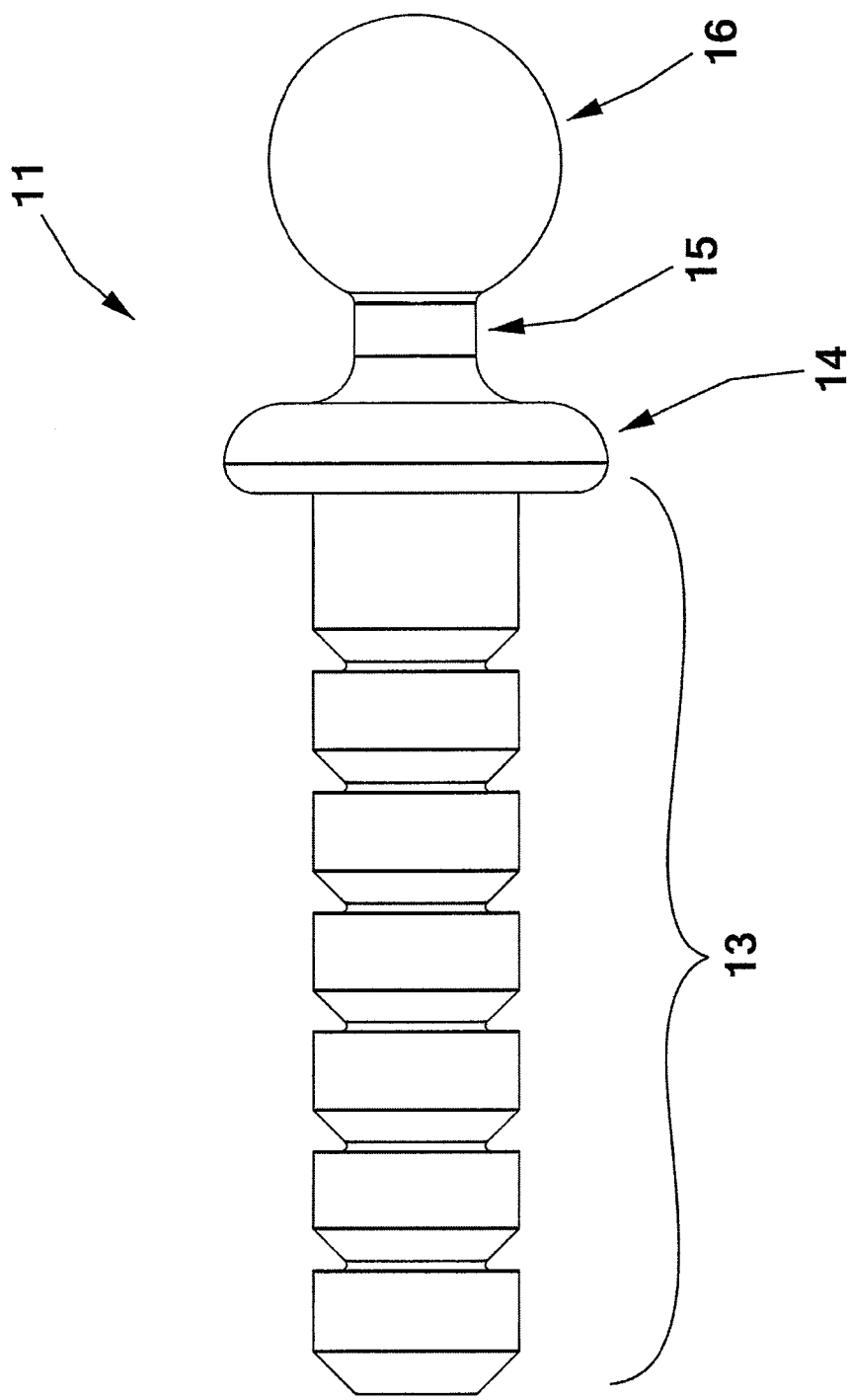
FIG. 2 is a more detailed view of a first embodiment of the stemball assembly.

FIG. 2 is a more detailed view of a first embodiment of the stemball assembly 11. The stemball assembly may be constructed of a durable, hard material such as, for example, plastic, metal such as stainless steel, and the like. A fluted shaft portion 13 may be inserted into a hollow tubular strap until the end of the strap reaches a cuff 14. A thin neck 15 connects to a ball 16. In one exemplary embodiment, the ball is approximately 4.58 millimeters (mm) in diameter; the neck is approximately 2.0 mm in diameter; the cuff is approximately 6.35 mm in diameter; and the fluted shaft portion is approximately 3.4 mm in diameter and 15 mm in length. These dimensions are exemplary only, and other dimensions may be utilized within the scope of the invention.

In an alternative embodiment for use with a solid strap, the shaft portion of the stemball may be hollow and have a larger diameter and a smooth or rough exterior. In this embodiment, the shaft has an inside diameter large enough for the solid strap to be inserted into the shaft and, for example, glued into place.

Figure 3:
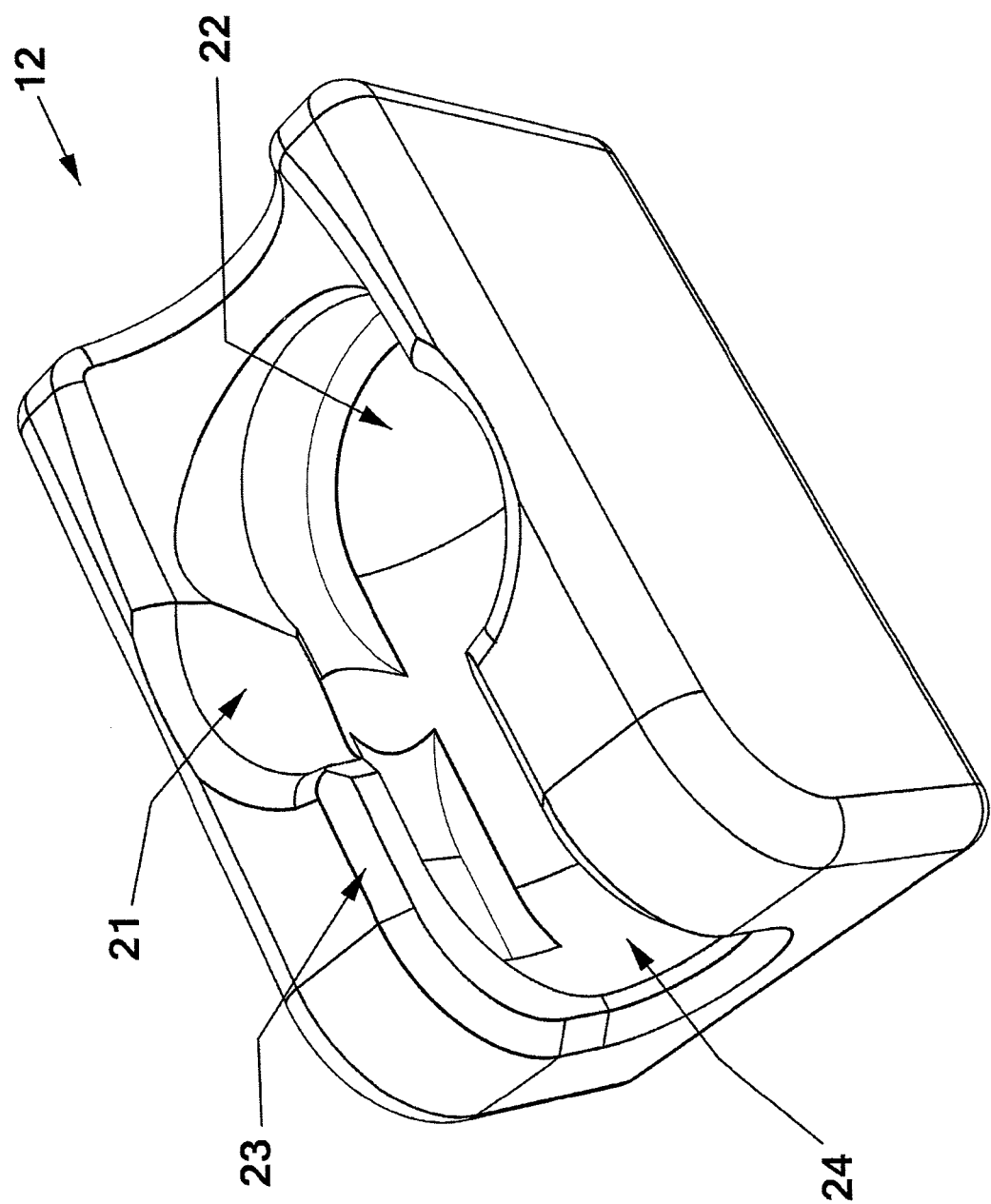
FIG. 3 is a perspective view of an embodiment of a socket for use with the stemball assembly of FIG. 2.

FIG. 3 is a perspective view of an embodiment of the socket 12 for use with the stemball assembly 11 of FIG. 2. The construction material of the socket housing may depend on the eyeglass frame material, but may be, for example, plastic, metal, composite material, or the like. The socket includes a round opening 21 for accepting the ball 16 of the stemball. A primary socket 22 is formed directly inside the opening. A slot 23 leads to a secondary socket 24. The slot allows the neck 15 of the stemball to slide toward the end of the socket as the user glides the ball by its shaft from the primary to the secondary socket.

Figure 4:
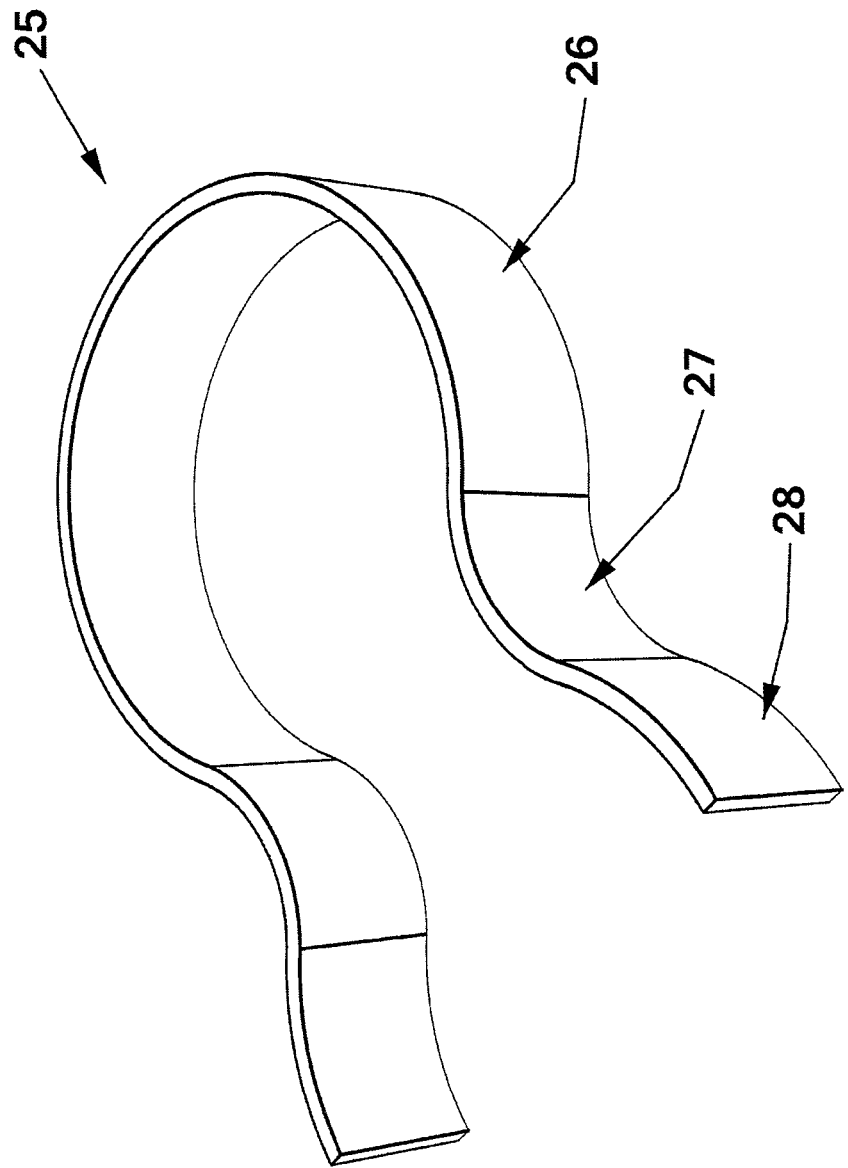
FIG. 4 is a perspective view of a spring mounted within the socket of FIG. 3.

FIG. 4 is a perspective view of a spring 25 mounted within the socket 12 of FIG. 3. The spring includes a rounded portion 26, a narrow restriction portion 27, and a diverging, open portion 28. The spring is mounted in a groove in the interior of the socket so that the rounded portion underlies the opening 21 and fits within the primary socket 22. The open portion 28 fits within the secondary socket 24. The narrow restriction portion underlies the slot 23.

The spring is preferably a flat strip, which may be made of a sturdy, hard material with good elastic memory, for example plastic or stainless steel. It can become wet without corrosion or malfunction. It also was designed to "build in tension" as the ball 16 of the stemball glides through the narrow restriction portion 27 until the ball audibly "snaps" or "clicks" into place (or out of place). The feeling of the building in tension as the stemball engages and passes through the narrow restriction portion 27 provides the user a tactile understanding of initiation/transit/and secure interlock of the stemball into its final resting position. The audible click created by the spring as the stemball snaps into the final locked position enables users (especially visually impaired users, the elderly, and children) to feel and hear that the ball was successfully positioned.

FIGS. 5A-5E illustrate an exemplary sequence of placing the stemball 11 into the socket 12, locking it into place, maneuvering the stemball within the socket, and rotating the stemball to a storage position. With additional reference to FIGS. 2-4, the operation of the mechanical connector will be described.

Figure 5A:
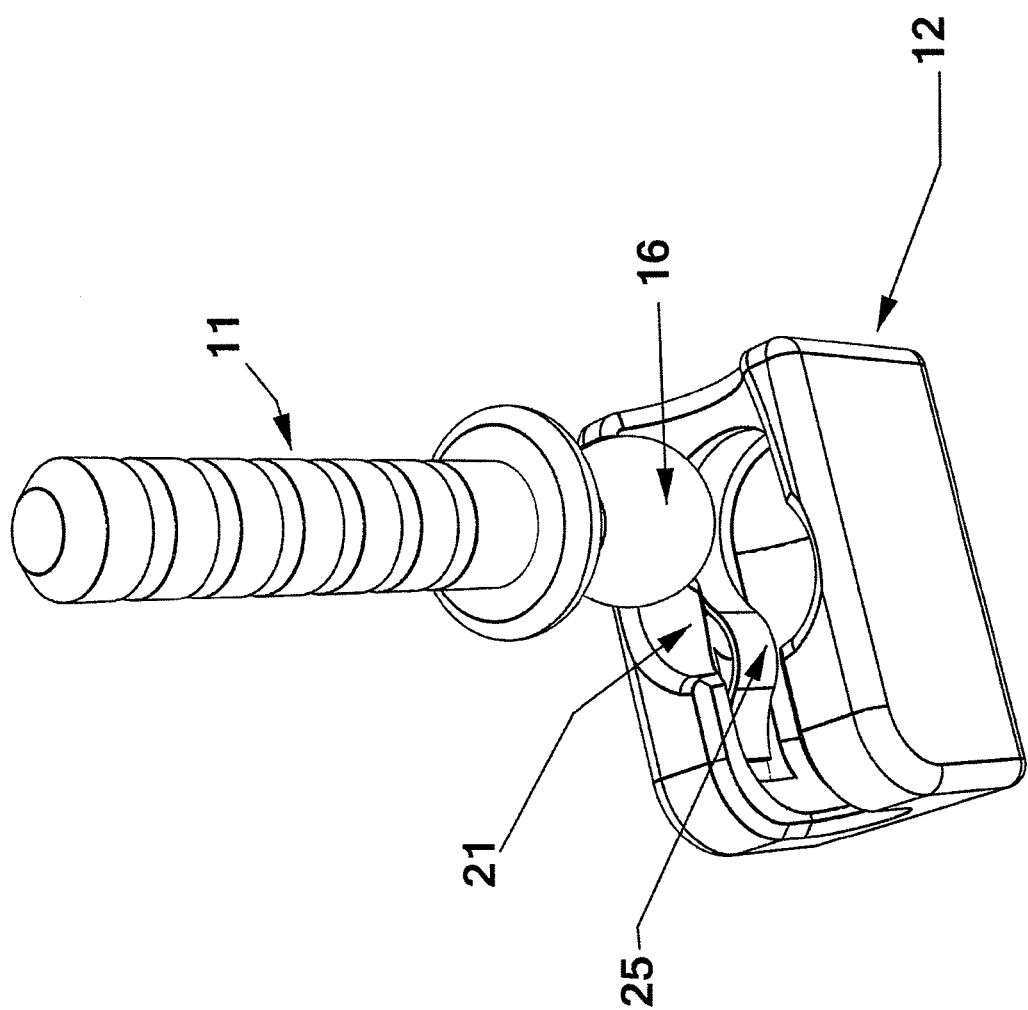
Figure 5C:
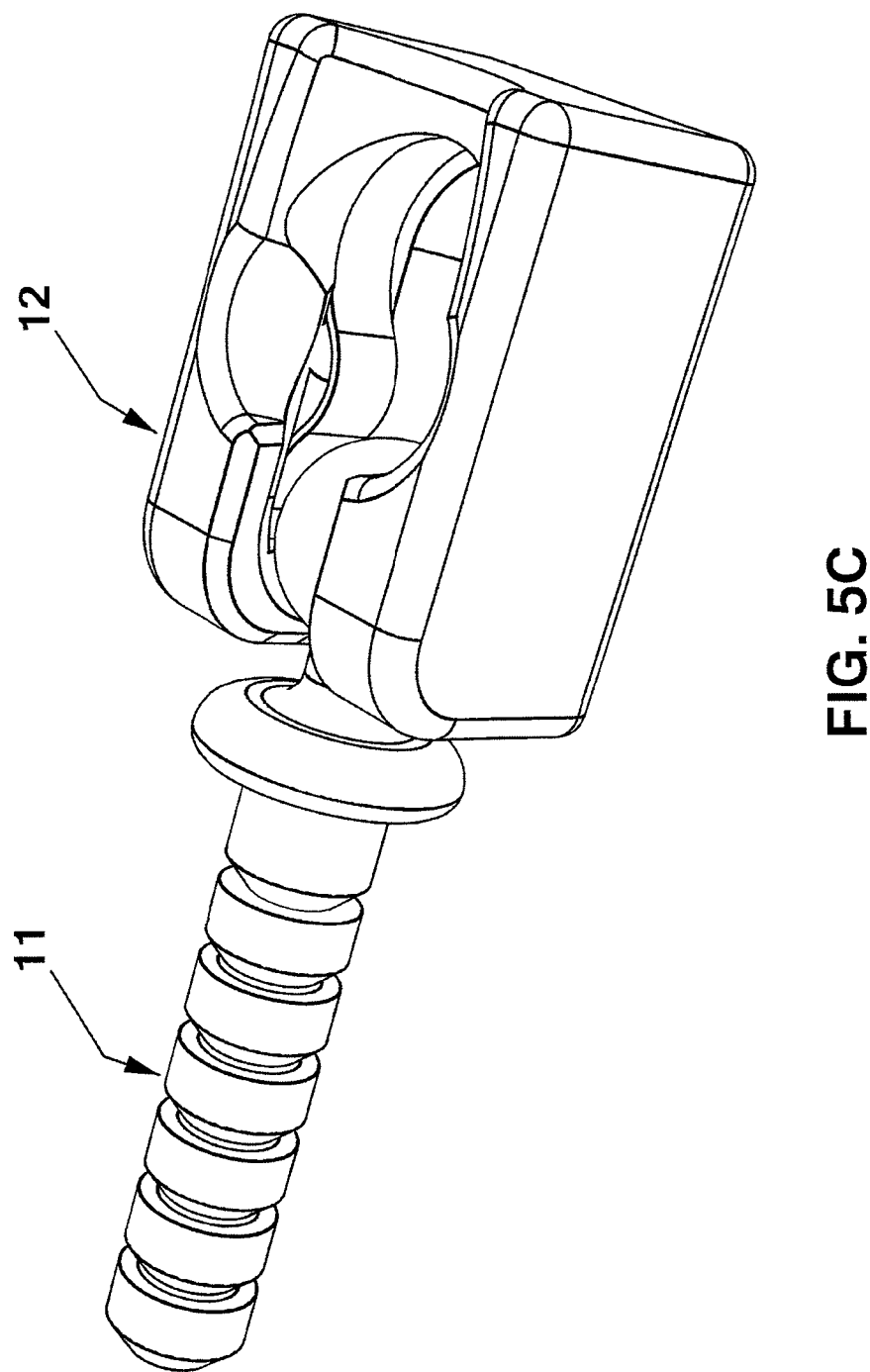

In FIG. 5A, the stemball assembly 11 is positioned in an "entry" position as it passes through the opening 21 of the socket 12. From that point, the user fully depresses the ball 16 into the primary socket 22 (See FIG. 3). The user then slides the neck 15 of the stemball (See FIG. 2) through the slot 23 and the narrow restriction portion 27 of the spring 25 (See FIG. 4) to glide the ball into a "fixed" position in the secondary socket 24 as shown in FIG. 5B. The shaft of the stemball is then rotated approximately 90 degrees to align the longitudinal axis of the stemball with the socket and place the stemball in a final "use" position as shown in FIG. 5C. Thus, the repeated stress of moving the stemball into and out of the "use" position is absorbed by the elastic spring 25 rather than the body of the socket 12. Therefore, the socket never becomes weaker and never breaks the housing.

Figure 5D:
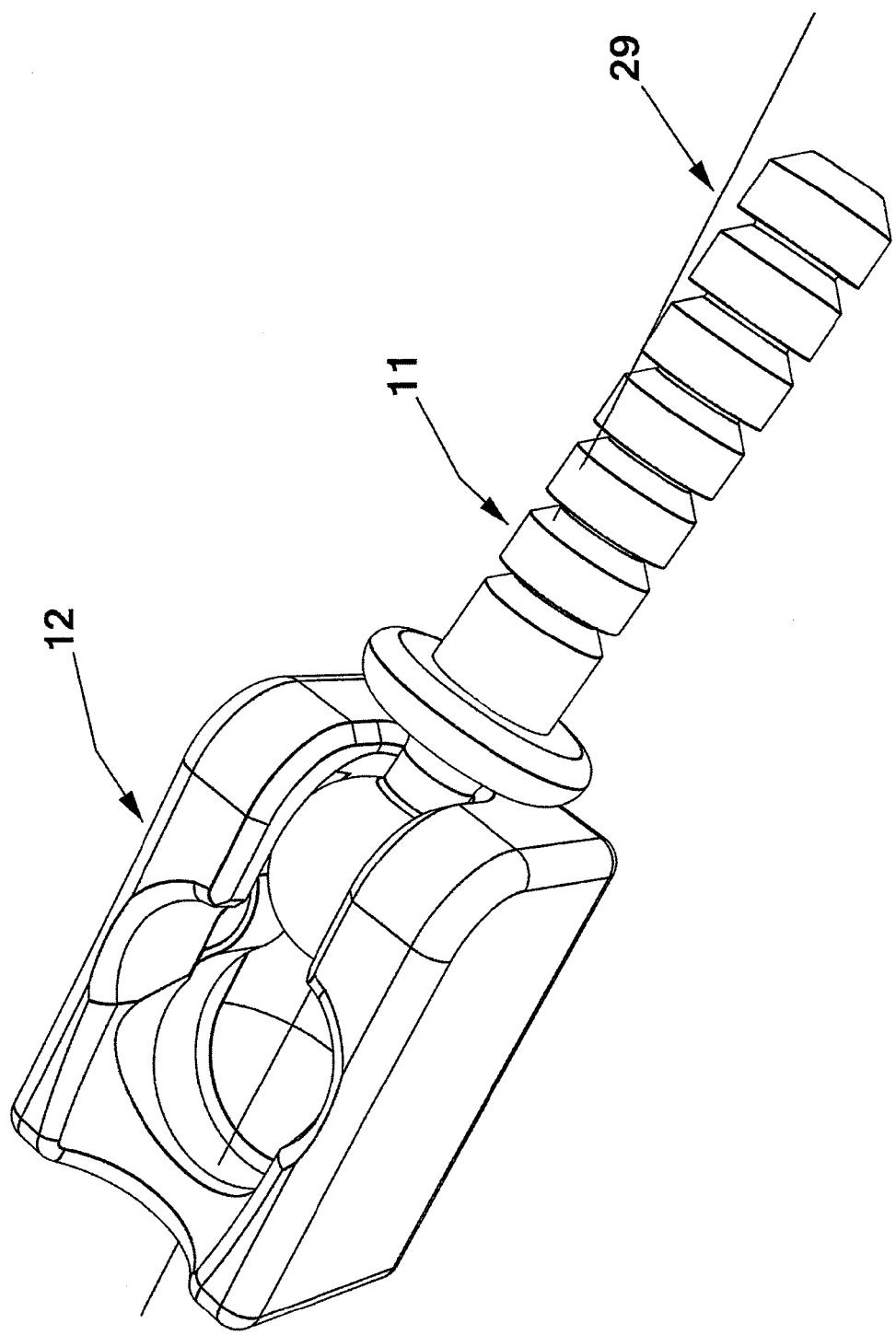

FIG. 5D illustrates that the stemball assembly 11 may swing from side to side relative to the longitudinal axis 29 of the socket housing while the ball 16 is locked in the secondary socket 24. Thus, the stemball, when locked into the final "use" position has much more movement than traditional earpieces. Earpieces, being fixed and rigid, can become restrictive and painful in certain active environments. This causes stress on the ears and temples of the user with the potential for discomfort or even breakdown of the skin on the ear or side of the user's face. The present invention overcomes these limitations. The stemball can freely rotate without restriction inward toward the user's temple when situated into its locked position, and depending on the length of the stemball neck 15 and diameter of the cuff 14, the stemball can rotate within a restricted range up and down and outward away from the user's temple. This freedom of movement provides greater positioning/movement/comfort as the user is engaged in different active settings rather that being rigid and restrictive as a traditional earpiece would. This versatility in positioning allows the eyewear to naturally seat into the optimal positioning of the strap in reference to the side of the user's face and ear. This movement also reduces stress on both the stemball and the socket when the strap affixed to the elongated shaft 13 causes the stemball to move.

The stemball assembly 11 may also rotate back to an intermediate position between the "fixed" position of FIG. 5B and the "use" position of FIG. 5C. While the stemball is locked in the secondary socket 24, the slot 23 allows the shaft to rotate freely in response to directional forces applied through the attached strap. Thus, the stemball assembly can emanate from the socket at an angle to provide comfort and free mobility and rotation in the socket when the glasses are in use in very mobile/action settings.

Figure 5E:
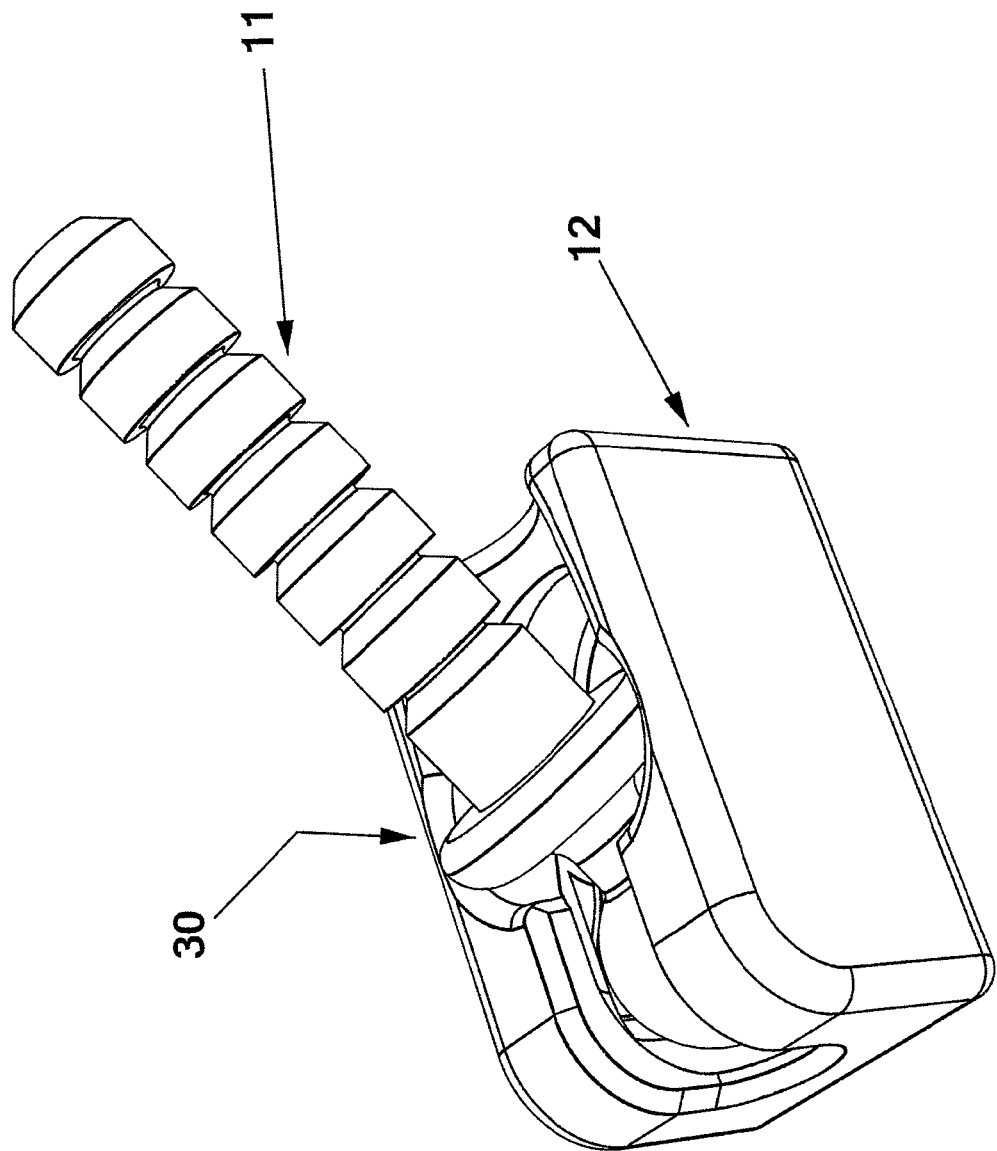

FIG. 5E illustrates the stemball assembly 11 being rotated toward a "storage" position while still fastened into the socket 12. When a user desires to store the eyeglasses in a case or in a pocket, the slot 23 of the socket allows the shaft of the stemball assembly to be rotated inward almost 180 degrees while the ball 16 remains fastened in the secondary socket 24. A widened "scalloped" portion 30 of the primary socket enables the broader cuff 14 to be inserted into the primary socket. This overcomes a potential problem of the stemball housing or stemball assembly breaking when the stemball assembly is rotated back upon itself for storage. This allows for the strap, when not being used, to be wrapped around the nosepiece of the frames, for example, for storage in a case or even in a pocket. If the connector did not allow for this retrograde rotation of the stemball assembly flat against the inside of the housing, the connector could potentially break in this area while in the user's pocket with relatively light pressure from sitting or when the pocket comes into contact with external objects.

The tension on the connector can easily be adjusted with a sliding tension nut on the strap if less movement of the joint is needed for activities like water-skiing/motorcycling/action sports, where traditional eyewear with earpieces would be less comfortable and more likely to disengage from the user's face.

The strap, being removable, can also be interchanged easily with straps of other colors, designs, and/or materials as long as the straps have an end-piece compatible with the connector. This enables the user to customize the eyeglasses for different fashion needs. Worn out straps can also be easily replaced without necessitating replacement of the entire eyeglass frame.

Additionally, since a strap affixed directly to the eyeglass frame is necessarily in contact with the side and back of the head and neck, the strap may become soiled with sweat, dirt, skin oils, perfumes, and other bodily contaminants. The removable strap of the present invention enables the user to remove the strap for cleaning in a washing machine or other disinfecting device without ruining the frames, lenses, or special coatings on lens surfaces.

An important factor in the design of any pair of eyeglasses is the pantoscopic tilt, that is, the near-vertical angle at which the frame 10 positions the lenses in front of the wearer's eyes. Pantoscopic tilt angles between 5° and 15° of forward tilt are common in the industry. An average default value is approximately 7°. Any pantoscopic tilting of a prescription lens away from this default design angle in either direction changes the angle in relation to the eye and can change the intended correction of the power of that lens thus blurring vision. Also, any change in the pantoscopic tilt can induce unwanted astigmatism correction to a lens, even a non-prescription clear lens or sunglass lens. This again can blur vision.

When earpieces attach near the tops of conventional eyeglass frames, the earpieces are typically mounted at an angle of approximately 83° from the desired pantoscopic tilt angle in order to achieve a 7° pantoscopic tilt. This angle increases as the point of attachment lowers, and when earpieces attach to the approximate middle of the frame, the angle approaches 90°.

The Applicant has discovered that when earpieces are omitted, straps that attach near the top of the frame must attach to the frame at a more acute angle because the rearward force exerted by the strap tends to rotate the frame upward. As can be appreciated, when the retainer strap is attached to the eyeglasses and tightened around the user's head, a rearward force is applied to the stemball assembly 11 and socket 12. If the user places the strap at the base of the back of the user's head (which is likely when only light or moderate retaining force is needed), a force directed both rearward and downward is applied to the socket. In either case, since the socket is mounted to the frame 10 at or near the top of the frame, the force from the strap rotates the frame upward, causing the top of the frame to move rearward where it may touch the user's eyebrows or eyelashes. In extreme cases, if the top of the frame is rotated too far to the rear, the top of the frame may touch the user's eyebrows or eyelashes causing discomfort, smearing on the lenses, and/or fogging of the lenses due to the lack of space between the brow and the top of the frame.

In exemplary embodiments described herein, to avoid frame rotation and achieve an approximate 7° pantoscopic lens tilt, the longitudinal axes of the frame sockets (relative to the desired pantoscopic tilt angle) measures approximately 70° when the sockets are attached near the top of the frame. The extra downward slope of the sockets counter-balances the upward rotational force on the frame by creating a moment arm within the stemball/socket connector that acts to rotate the frame 10 downward, restoring the proper pantoscopic tilt. This may be accomplished in a number of ways, two examples of which are described herein.

In both examples, the range of movement of the stemball assembly 11 in the upward direction when mounted in the socket 12 is purposely restricted. As noted above in the description of FIG. 5D, when the ball 16 is situated in its locked position, the stemball assembly can still rotate within a restricted range in the upward direction, depending on the length of the stemball neck 15 and the diameter of the cuff 14. To restrict the range of movement in the upward direction, the neck may be made relatively short and/or the diameter of the cuff may be made relatively large so that the range of movement in the upward direction is restricted when the cuff makes contact with the rear edge of the socket 12.

Figure 6:
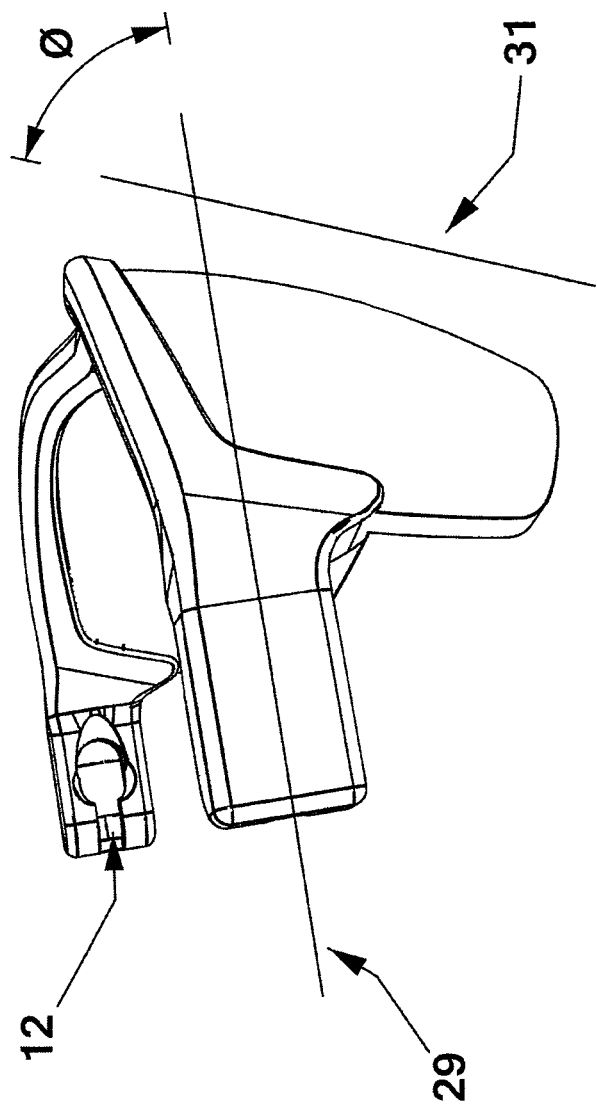
FIG. 6 is a front-quarter perspective view of the earpiece-less eyeglass frame in a first embodiment in which a socket is configured to maintain a proper pantoscopic tilt when a rearward force is applied to the stemball assembly by the retainer strap.

FIG. 6 is a front-quarter perspective view of the earpieceless eyeglass frame 10 in a first embodiment in which a socket is configured to maintain a proper pantoscopic tilt when a rearward force is applied to the stemball assembly 11 by the retainer strap. In this embodiment, the socket housing is mounted to the frame at an angle φ such that the longitudinal axis 29 of the socket housing is angled approximately 70° relative to a desired pantoscopic tilt angle 31. A rearward pull on the retainer strap places a force component on the stemball assembly in the upward direction, thereby rotating the frame downward and restoring the proper pantoscopic tilt.

Figure 7:
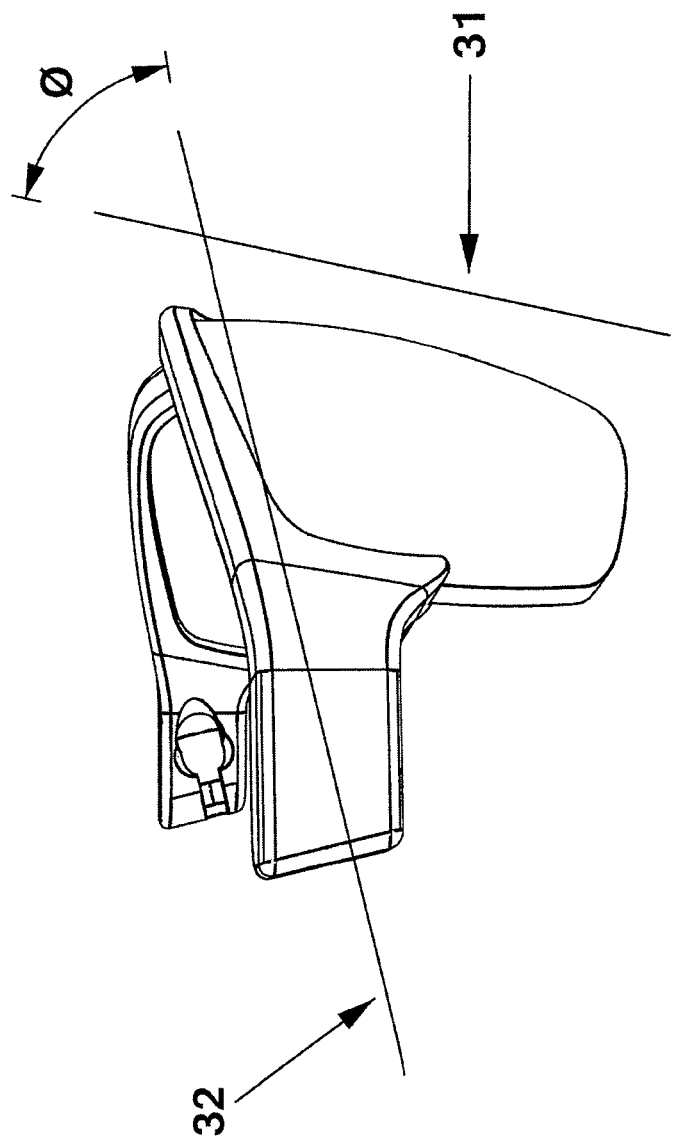
FIG. 7 is a front-quarter perspective view of the earpiece-less eyeglass frame in a second embodiment in which a socket is configured to maintain a proper pantoscopic tilt when a rearward force is applied to the stemball assembly by the retainer strap.

FIG. 7 is a front-quarter perspective view of the earpieceless eyeglass frame 10 in a second embodiment in which a socket is configured to maintain a proper pantoscopic tilt when a rearward force is applied to the stemball assembly 11 by the retainer strap. In this embodiment, rather than angling the socket housing downward, the housing is mounted closer to the standard 83° relative to the vertical axis of the frame front, and the socket within the housing is angled downward approximately 5-15 degrees so that a longitudinal axis 32 of the socket itself (rather than the housing) is angled approximately 70° relative to the desired pantoscopic tilt angle 31. Once again, a rearward pull on the retainer strap places a force component on the stemball assembly 11 in the upward direction, thereby rotating the frame downward and restoring the proper pantoscopic tilt.

Figure 8:
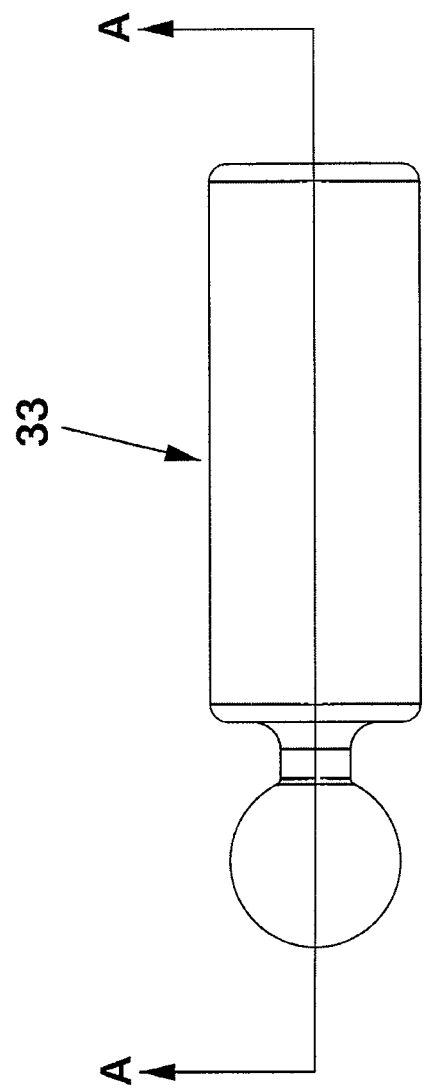
FIG. 8 is a side view of a second embodiment of the stemball assembly.

FIG. 8 is a side view of a second embodiment of the stemball assembly. In this embodiment, the stemball includes a hollow tubular shaft portion 33 into which a solid retainer strap may be inserted. The strap may be glued inside the shaft. This embodiment of the stemball does not need a cuff, which operates partly to fix the position of a hollow strap that slides over the shaft 13 of the first embodiment of the stemball. In one exemplary embodiment, the ball is approximately 4.58 millimeters (mm) in diameter; the neck is approximately 2.0 mm in diameter and 1.8 mm long; the hollow shaft portion is approximately 16 mm long and has an outside diameter of approximately 6.0 mm and an inside diameter of approximately 3.2 mm. These dimensions are exemplary only, and other dimensions may be utilized within the scope of the invention.

FIG. 9 is a cross-sectional view of the second embodiment of the stemball assembly of FIG. 8 taken along line A-A. This view shows a cavity 35 within the hollow tubular shaft portion 33 where the solid retainer strap may be inserted and glued into position.

The outside surface of the tubular shaft portion 33 may be smooth, or may be rough for better grip. The tubular shaft portion may have any of a number of designs, patterns, or colors added to it as a form of jewelry and or decoration. Additionally, the ball itself may be decorated to look like a sports ball such as a tennis ball, golf ball, soccer ball, baseball, basketball, and the like for fashion statements or to add uniqueness to the stemball.

It should be noted that when the socket housing or socket is angled down as shown in FIGS. 6 and 7, this embodiment of the stemball still operates to reduce the upward rotation of the frame. The angled housing/socket still produces downward torque on the frame when a rearward force is applied to the strap. Additionally, the angle effectively lowers the point where the strap connects to the frame (closer to the midpoint like goggles) thus reducing the upward torque on the frame produced by tension on the strap.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any and all modifications that fall within the scope of the invention defined by the following claims.

What is claimed is:

1. An earpiece-less eyeglass apparatus, comprising:
   a lenticular frame for holding at least one eyeglass lens; and
   first and second attachment mechanisms on each side of the lenticular frame for removably attaching a retainer strap directly to the frame, each of the first and second attachment mechanisms comprising:
   an elongate stemball assembly having a shaft portion, a ball, and a neck portion joining the shaft and the ball, wherein the shaft portion is configured to connect to an end of the retainer strap, and the ball has a diameter greater than the neck portion;
   a socket housing having formed therein, a primary hollow socket, a secondary hollow socket, and a narrow slot joining the primary and secondary sockets, wherein a front end of the socket housing is mounted to the lenticular frame; and
   an elastic flat metal strip mounted within the primary and secondary hollow sockets and underlying the slot, the strip being shaped to form a rounded portion within the primary socket, a narrow restriction portion underlying the slot, and a diverging portion within the secondary socket;
   wherein the rounded portion of the elastic flat metal strip is sized to receive the ball of the stemball assembly, and the narrow restriction portion locks the ball into the secondary socket without placing stress on the housing when the ball of the stemball assembly is pressed through the narrow restriction portion into the diverging portion of the strip.

2. The earpiece-less eyeglass apparatus according to claim 1, wherein the frame holds the lenses at a desired pantoscopic tilt angle, and the socket housing is mounted to the lenticular frame such that a longitudinal axis of the socket housing is angled approximately 70 degrees from the desired pantoscopic tilt angle.

3. The earpiece-less eyeglass apparatus according to claim 2, wherein the stemball assembly also includes a cuff positioned between the neck portion and the shaft portion, the cuff having a diameter greater than the neck portion, wherein the cuff is sized and positioned to limit rotation of the stemball assembly in the upward direction when the cuff comes into contact with a rear end of the socket housing.

4. The earpiece-less eyeglass apparatus according to claim 1, wherein the frame holds the lenses at a desired pantoscopic tilt angle, and a longitudinal axis formed by the primary hollow socket, the narrow slot, and the secondary hollow socket is angled approximately 70 degrees from the desired pantoscopic tilt angle.

5. The earpiece-less eyeglass apparatus according to claim 4, wherein the stemball assembly also includes a cuff positioned between the neck portion and the shaft portion, the cuff having a diameter greater than the neck portion, wherein the cuff is sized and positioned to limit rotation of the stemball assembly in the upward direction when the cuff comes into contact with a rear end of the socket housing.

6. The earpiece-less eyeglass apparatus according to claim 1, wherein the narrow slot joining the primary and secondary sockets allows the stemball assembly to rotate inward without restriction.

7. The earpiece-less eyeglass apparatus according to claim 1, wherein the stemball assembly also includes a cuff positioned between the neck portion and the shaft portion, the cuff having a diameter greater than the neck portion, and the primary socket includes at least a portion sized to accept the cuff, wherein the narrow slot joining the primary and secondary sockets allows the stemball assembly to rotate inward without restriction to a storage position in which the cuff is placed into the primary socket while the ball remains in the secondary socket.

8. The earpiece-less eyeglass apparatus according to claim 7, wherein the stemball assembly rotates inward approximately 180 degrees to the storage position.

9. The earpiece-less eyeglass apparatus according to claim 1, wherein the elastic flat metal strip is constructed of a hard material that produces an audible snap when the ball of the stemball assembly is pressed through the narrow restriction portion and passes into the diverging portion of the strip.

10. The earpiece-less eyeglass apparatus according to claim 9, wherein the elastic flat metal strip also provides tactile feedback to a user as tension builds in the strip while the user presses the ball of the stemball assembly through the narrow restriction portion until the tension is released and the audible snap is produced as the ball of the stemball assembly passes into the diverging portion of the strip.

11. An attachment mechanism for removably attaching a strap to an object, the attachment mechanism comprising:

an elongate stemball assembly having a shaft portion, a ball, and a neck portion joining the shaft and the ball, wherein the shaft portion is configured to connect to an end of the strap, and the ball has a diameter greater than the neck portion;

a socket housing having formed therein, a primary hollow socket, a secondary hollow socket, and a narrow slot joining the primary and secondary sockets, wherein a front end of the socket housing is configured to mount to the object; and an elastic flat metal strip mounted within the primary and secondary hollow sockets and underlying the slot, the strip being shaped to form a rounded portion within the primary socket, a narrow restriction portion underlying the slot, and a diverging portion within the secondary socket;

wherein the rounded portion of the elastic flat metal strip is sized to receive the ball of the stemball assembly, and the narrow restriction portion locks the ball into the secondary socket without placing stress on the housing when the ball of the stemball assembly is pressed through the narrow restriction portion into the diverging portion of the strip.

12. The attachment mechanism according to claim 11, wherein the stemball assembly also includes a cuff positioned between the neck portion and the shaft portion, the cuff having a diameter greater than the neck portion, and the primary socket includes at least a portion sized to accept the cuff, wherein the narrow slot joining the primary and secondary sockets allows the stemball assembly to rotate inward without restriction to a storage position in which the cuff is placed into the primary socket while the ball remains in the secondary socket.

13. The attachment mechanism according to claim 12, wherein the stemball assembly rotates inward approximately 180 degrees to the storage position.

14. The attachment mechanism according to claim 11, wherein the elastic flat metal strip is constructed of a hard material that produces an audible snap when the ball of the stemball assembly is pressed through the narrow restriction portion and passes into the diverging portion of the strip.

15. The attachment mechanism according to claim 14, wherein the elastic flat metal strip also provides tactile feedback to a user as tension builds in the strip while the user presses the ball of the stemball assembly through the narrow restriction portion until the tension is released and the audible snap is produced as the ball of the stemball assembly passes into the diverging portion of the strip.

* * * * *